July 20, 1926.
G. F. BOTALI
1,593,422
INTERNAL COMBUSTION ENGINE RADIATOR
Filed Dec. 26, 1922      3 Sheets-Sheet 1
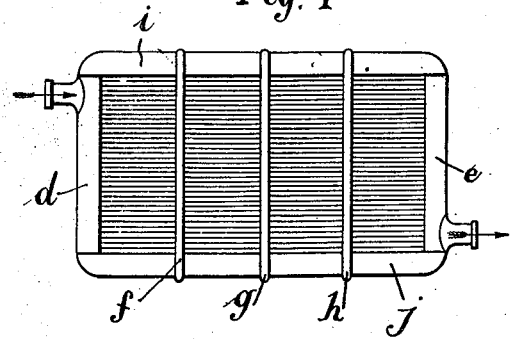
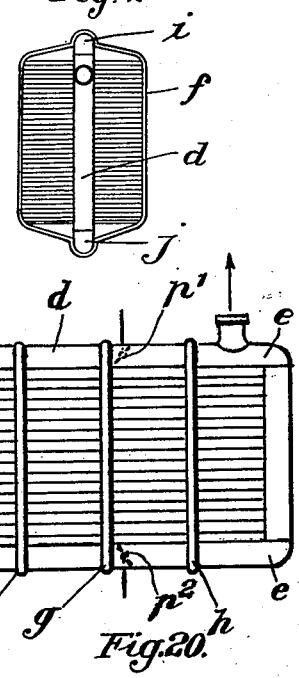
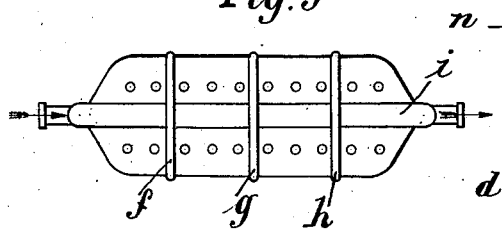
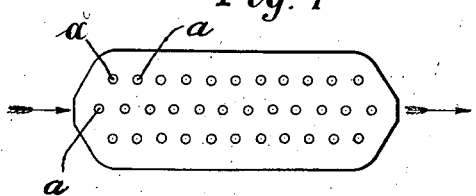
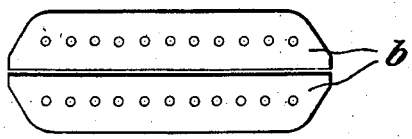
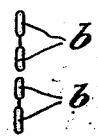
Inventor.
Gaston F. Botali
By Henry Orth Jr.
atty.

July 20, 1926.
G. F. BOTALI
1,593,422
INTERNAL COMBUSTION ENGINE RADIATOR
Filed Dec. 26, 1922     3 Sheets-Sheet 2
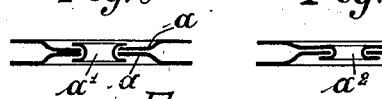
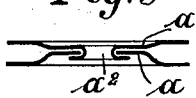
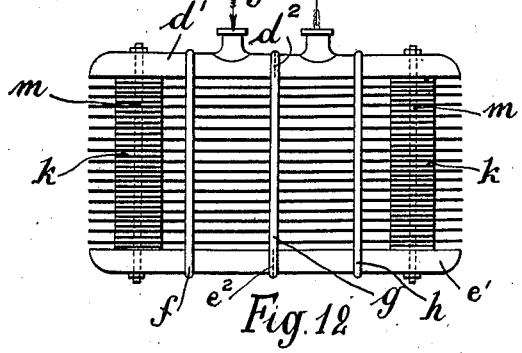
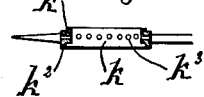
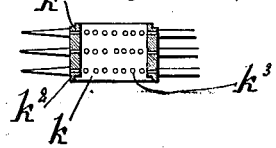
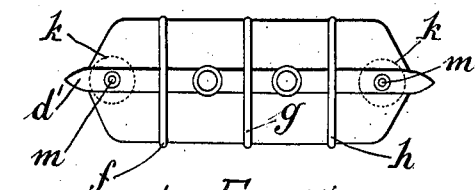
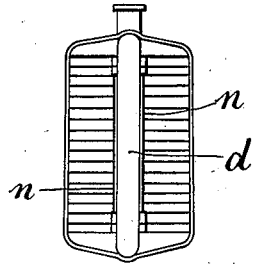
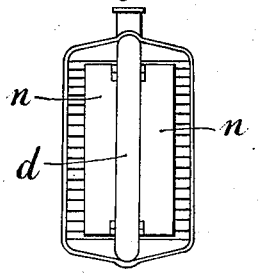
Inventor
Gaston F. Botali,
By [signature] Atty.

July 20, 1926.

G. F. BOTALI 1,593,422

INTERNAL COMBUSTION ENGINE RADIATOR

Filed Dec. 26, 1922   3 Sheets-Sheet 3

Inventor
Gaston François Botali
by Henry Orth
Atty

Patented July 20, 1926.

1,593,422

UNITED STATES PATENT OFFICE.

GASTON FRANÇOIS BOTALI, OF PARIS, FRANCE, ASSIGNOR TO ALEXANDRE LAMBLIN, OF PARIS, FRANCE.

INTERNAL-COMBUSTION-ENGINE RADIATOR.

Application filed December 26, 1922, Serial No. 609,143, and in France January 10, 1922.

This invention relates to a radiator using water or any other suitable liquid, for internal combustion engines and particularly for engines used for aviation purposes.

According to this invention, the radiator is constituted by a series of hollow blades, made of thin metal placed in parallel one above the other, open at both ends and communicating through these open ends with tubular collectors, said blades being placed longitudinally and in the direction of the air displacement.

Referring to the appended drawings which shows several manners of carrying out the construction of a radiator according to this invention:—

Figs. 1, 2 and 3 are diagrammatic views: Fig. 1 is a side elevation of such a radiator;

Fig. 2 is a front elevation and Fig. 3 is a plan view.

Figs. 4 and 5 are respectively a plan and a transverse section of an element of the radiator.

Figs. 6 and 7 illustrate an alternative construction of the elements.

Fig. 8 shows a device used for staying the blades provided with set eyelets.

Figs. 9 and 10 illustrate an alternative manner of setting by means of the metal of the blades itself.

Figs. 11 and 12 are respectively side and plan views of a removable radiator with interchangeable blades.

Figs. 13 and 14 illustrate two alternative arrangements of the interchangeable blades.

Figs. 15, 16 and 17 are respectively a side view, a front view and a plan view of a radiator provided with Venetian blinds, these being shewn in the open position.

Figs. 18 and 19 are similar views showing the blinds in the closed position. Fig. 20 shows the location of a valve in the upper and lower stay.

Figure 17:
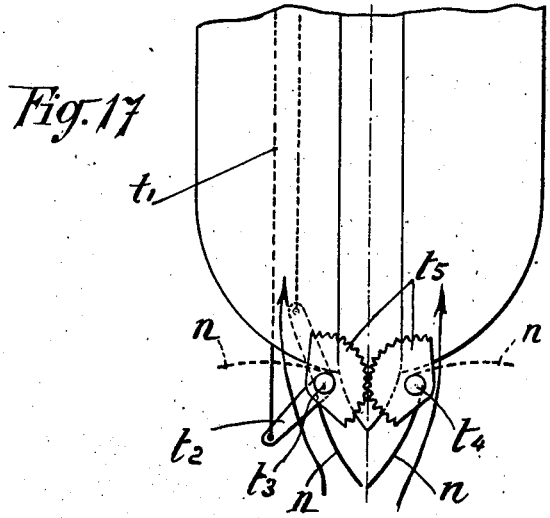

According to this invention the radiator is constituted by a series of hollow blades (Figs. 4 and 5) open at both ends, made of thin metal, such as copper sheets, for instance, through which the circulation of the liquid takes place. These blades may be in any suitable number, which number is a function of the cooling action required.

In order to allow these hollow blades or flat tubes to maintain a constant cross-section, the parallel portions of their walls are stayed internally by stamping them so as to form a series of raised portions $a$ on the inside, (Figs. 4 and 5) in any suitable number, which keep these portions apart at the required distance. These stampings allow, besides, these two faces of the flat tubes or blades to be secured together by spot soldering, the whole being therefore given a greater rigidity. The flat and hollow blades may be replaced by a certain number of flat tubes $a$ secured side by side (Figs. 6 and 7) or by a single flat tube divided longitudinally into sections by suitable partitioning walls.

As shewn in Fig. 8, the small stamped portions $a$ are thus brought into contact and these stamped parts are tightened and secured by means of small tubular rivets or eyelets $a^1$ which are pressed into place, the edge being then soft soldered in order to form a tight joint.

A like construction may be obtained by the exclusive use of the metal of the tubes, the metal being pressed and the device being thus fastened without any additional pieces, as shewn at $a^2$ in Figs. 9 and 10, wherein the eyelet $a^2$ is formed by the metal of one or both faces to be connected together, the requisite metal being obtained by the embossing process with a suitable tool which produces a preliminary hole of smaller size than the final hole, and by a drawing process in order to form the flanged parts for fastening purposes. The said fastening arrangement is advantageous as requiring the use of soft soldering upon only one of the surfaces.

Two tubular collecting chambers or manifolds $d$ and $e$ (Fig. 1) are disposed at the extremities of the blades or tubes, connecting them to one another, giving them the desired spacing and permitting the cooling liquid to distribute itself in all the said blades or tubes and to flow in them in a longitudinal direction.

The water or liquid to be cooled enters in one of the said collecting chambers or manifolds, for example $d$ and issues by the other for example $e$. The circulation of the air intended to cool by its contact the blades and consequently the liquid they contain, takes place between these blades, and for this purpose they are maintained at a constant distance apart by the collecting chambers and external hoops $f, g, h$ (Figs. 1 and 3). The two collecting chambers may be connected by tubular stays $i, j$ (Fig. 1) if it is required to obtain still greater rigidity.

In the arrangement shown in Figs. 1 to 3, the blades used for cooling purposes are soldered at their ends to the collecting chambers or manifolds $d, e$. In some cases it may be preferable especially in view of repairs, that the radiator elements shall be removable and interchangeable, and this can be obtained as shewn in Figs. 11 to 14 by the use of metal rings $k$, Fig. 13, which have formed on one face a groove $k^1$ and on the other a complementary beading $k^2$, so that any suitable number of tubes or elements can be superposed to make up the front and rear monifolds and the radiator. The said rings are soldered at the middle of the ends of each tube or element and have holes $k^3$ around the edge for proper circulation of water in the whole of said element; the tubes thus placed together in series are connected and held together by the rods $m$ which are screwthreaded at the ends and extend through the manifold sections or rings $k$, the whole device being held together by nuts whose pressure upon the collecting chambers $d$ and $e$ will produce tight joints between the various elements.

Should it not be necessary to provide for an entirely interchangeable device, a certain number of elements or blades can be mounted upon a common ring $k$, for instance two or three, or a greater number, as shewn in Fig. 14.

Instead of disposing the collecting chambers or manifolds at the extremities of the blades or tubes as in Figs. 1 to 3 chambers $d', e'$ may be disposed at the top and bottom respectively of the plates, as shown in Figs. 11 and 12. These chambers or manifolds constitute frame members or stays and are preferably made in two sections joined together as indicated at $d^2, e^2$. Although the circulation takes place under the same conditions as in Figs. 1 to 3 the tubular inlets and outlets are preferably disposed in the top collecting chamber $d'$. It is however advantageous that both sections of the chambers shall not be entirely disconnected against circulation from one section to the other and to this end some of the cooling liquid is permitted to pass though the joints without passing through the plates in order to maintain the stays at about the temperature of the adjacent plates and thereby prevent undue expansion due to temperature differences.

The said inlets and outlets may also be mounted at any suitable point on the top collecting chamber provided one of the same shall be situated at either side of the joint.

The said blades or tubes may also be braced and protected by means of removable metal hoops or straps $f, g, h$.

Whether the radiator is provided only with a collector comprising an upper and a lower tube, Fig. 11, or is constituted by a rigid frame, Fig. 15, the front and rear of the radiator will have a more or less pointed disposition as shewn in Fig. 12 so as to offer a reduced resistance to advance.

The radiator when mounted upon an aeroplane can be provided with a device to diminish the cooling action when flying at high level or in cold weather.

Figure 18:
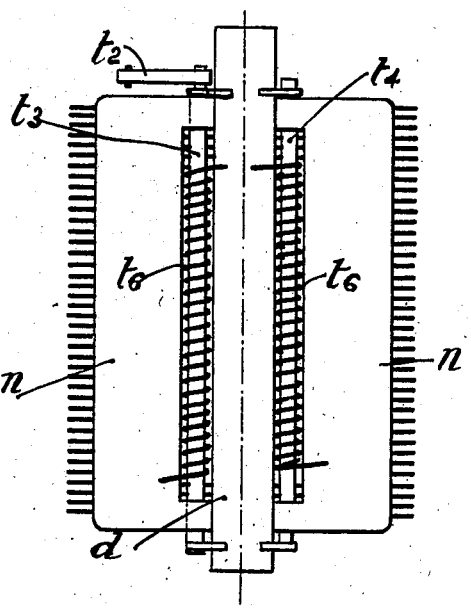

The regulation of the cooling of the liquid circulating in the radiator may be carried out by a Venetian blind or screening arrangement $n$, Figs. 15 to 19, controlled as desired in order to more or less cover the said blades or tubes and protect them from the air. These shutters or blinds $n$ conform to the shape of the front of the radiator or to the front manifold and normally lie thereagainst when open. The means for controlling these shutters $n$ may be of any desired construction; for example, as illustrated in Figs. 17 and 18, a cable $t$ passing to any kind of a control device adjacent the operator's position in the flying machine is connected to a lever $t_2$ fixed on the spindle $t_3$ of one of the shutters. This spindle also controls the spindle $t_4$ of the companion shutter by intermeshing sectors $t_5$. A spring $t_6$ for each shutter urges them into their open position against the front manifold $d$ as soon as the cable $t$ is released.

The particular mounting of the shutters per se is not novel in aviation, and is illustrated only by way of example, and may be replaced by any other.

For a like purpose it may be advantageous to slow up the circulation of water in the radiator by disposing one or two throttle or like valves $p^1, p^2$ Fig. 20 upon the main sides of the radiator, and operated either by automatic means or by devices under the pilot's control.

The position of the radiator may vary according to the cooling it is desired to obtain. It is however necessary to place it in such a position that the air may circulate most easily between the metallic blades into which the liquid circulates. Also, the number of radiator blades may vary according to the number of calories to be dissipated and the dimensions of the radiator used.

It will be understood that the invention is not limited in scope to the manner of construction specifically described, but it covers its various modifications.

Radiators constructed according to this invention offer many advantages, the most important of which are a much reduced resistance to advance, owing to the small cross section, formed by the ends of the blades, placed longitudinally in the direction of the air displacement, small weight and reduced liability to fracture owing to the rigidity of the whole and the small number of soldering joints.

Having now particularly described and ascertained the nature of my said invention and in what manner the same is to be performed, I declare that what I claim is:—

1. In a radiator, especially for flying machines, a front manifold and a rear manifold, hollow cooling elements connected between the manifolds, each element comprising a single hollow flat sheet substantially parallel to the direction of movement, extending mainly beyond opposite sides of the manifolds and having a central portion of uniform width and end portions tapering toward the manifolds, and having rounded outer corners where the tapered portions meet the sides of the elements.

2. In a radiator, especially for flying engines, a front manifold, a rear manifold, flat, hollow cooling plates extending between and connected to the manifolds, longitudinal, tubular stays connecting the ends of the manifolds, and means in said stays to restrict the circulation of cooling liquid between the ends of the stays, and separating the entering and discharging cooling liquid.

3. In a radiator, especially for flying engines, a front manifold, a rear manifold, flat, hollow cooling plates extending between and connected to said manifolds, hollow longitudinal stays connecting the ends of the manifolds and forming with the manifolds a frame for the plates, and valves intermediate the ends of the stays to control the circulation through the stays.

4. In a radiator, especially for flying engines, a front manifold, a rear manifold, hollow horizontal plates extending between and connected to said manifolds, stays connecting the ends of the manifolds and forming therewith a frame around said plates, and hoops passing around said stays and plates.

5. In a radiator, especially for flying engines, a front manifold, a rear manifold, flat, hollow cooling plates connected between said manifolds, shutters mounted on the front manifold, means to hold the shutters against the front manifold when not in obturating position, and means to move the shutters over the front edges of the plates to control the quantity of air passing between the plates.

6. In a radiator, especially for flying engines, a front manifold and a rear manifold each composed of ring sections, one or more flat, hollow horizontal plates connected to and communicating with a front and a rear section, hollow stays connecting the ends of the manifolds and bolts passing through the ends of said stays and the interior of the sections, and means to control circulation between the ends of said stays.

In testimony that I claim the foregoing as my invention, I have signed my name.

GASTON FRANÇOIS BOTALI.